July 12, 1960 F. DALTON 2,944,439
ACCELERATOR PEDALS FOR MOTOR VEHICLES
Filed March 8, 1957 2 Sheets-Sheet 1
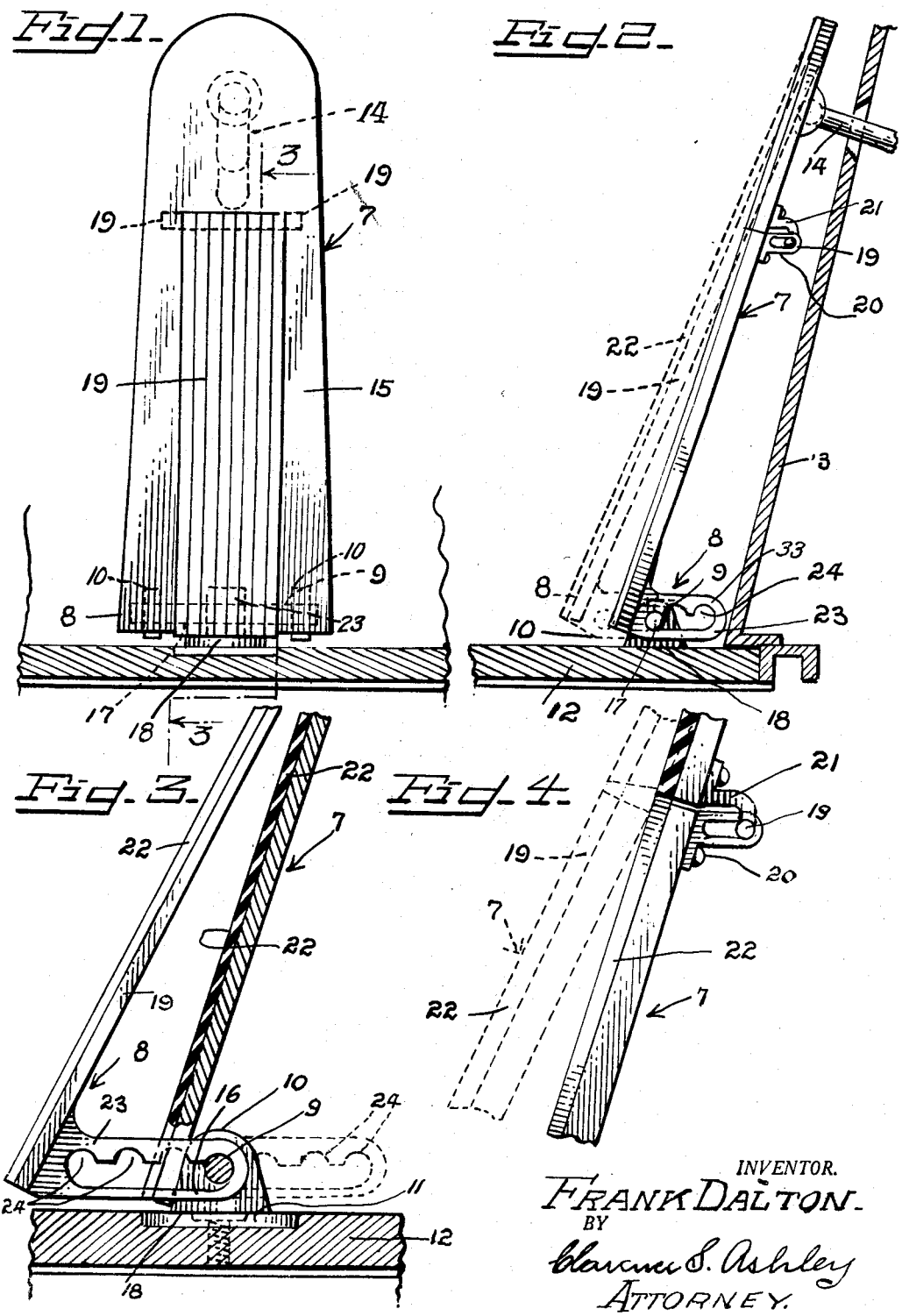
INVENTOR.
FRANK DALTON.
BY
Clarence S. Ashley
ATTORNEY.

July 12, 1960  F. DALTON  2,944,439
ACCELERATOR PEDALS FOR MOTOR VEHICLES
Filed March 8, 1957  2 Sheets-Sheet 2
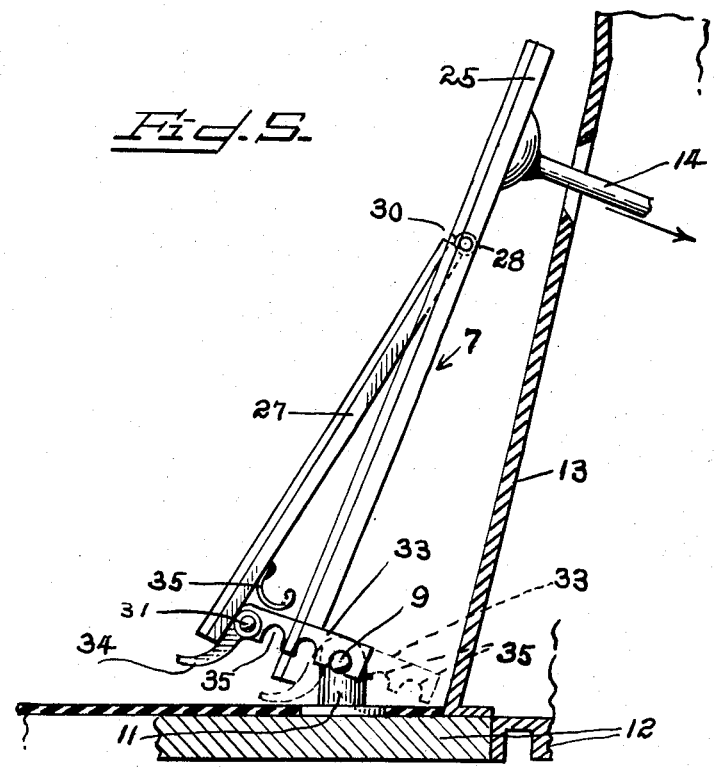
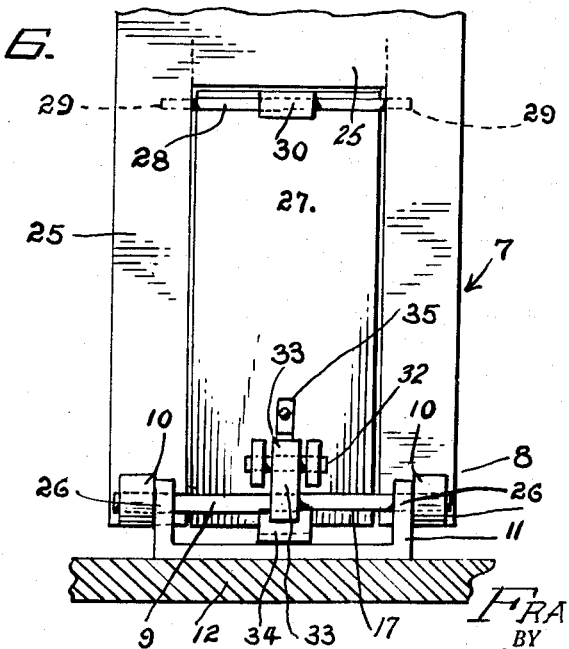
INVENTOR.
FRANK DALTON
BY Clarence S. Ashley
ATTORNEY

United States Patent Office 2,944,439
Patented July 12, 1960

2,944,439

ACCELERATOR PEDALS FOR MOTOR VEHICLES

Frank Dalton, 425 Riverside Drive, New York, N.Y.

Filed Mar. 8, 1957, Ser. No. 644,915

5 Claims. (Cl. 74—562)

The invention relates to improvements in accelerator pedals for motor vehicles and has particular reference to a pedal having an adjustable center panel within the pedal body for the released positioning of the foot of the operator whereby the adjusted juxtapositioning of the foot is effective at the heel of the foot, the sole or frontal portion of the foot retaining its normal placement to relieve all tension and stress on the leg tendons and muscles.

The object of the invention resides in the providing of a foot accelerator pedal for all types of motor vehicles wherein the center portion of said pedal is adjustable rearwardly toward the driver's foot only at the heel part of the pedal, so that, actually the heel of the operator is drawn away from the aligning surface of the pedal permitting the sole portion of the foot to remain as positioned in order that since the stress of improper positioning alters and changes constantly all excessive strain upon the leg tendons and muscles are altered at the heel of the foot, the normal center of the necessary proper positioning of the foot of an operator of a vehicle.

Another object of the invention lies in the providing of an accelerator pedal having a normal flush aligned operating foot surface, and of the providing of means for adjusting a center body section thereof or panel that when drawn backwardly provides a multiple adjustment for the heel of the foot only, rendering it effective for drivers sized feet as well as the length of the legs of the operator of a motor vehicle.

In the following, there is described, herein, the general embodiment of the invention the features thereof being more fully described hereinafter in the claims forming a part hereof.

In the drawings:

Figure 1 is a face elevation of the accelerator pedal in its position on the floor cowl of a car.

Figure 2 is a side elevation of the pedal, the floor board and cowl panel being shown in section.

Figure 3 is an enlarged vertical sectional view of the extreme adjusted position of the pedals center panel adjusting element, said section being disposed on the line 3—3 of Figure 1 of the drawings.

Figure 4 is a side elevation of the means of supporting the adjuster panel on the major pedal frame.

Figure 5 is a modification of the pedal adjuster means shown in side elevation and illustrating a finger or foot-clip for adjusting the movable center panel to its several spacer adjustments, and Figure 6 is a rear elevation of the pedal adjusting structure shown in Figure 5 of the drawings.

Similar numerals of reference indicate like and corresponding parts throughout the several views of the drawings.

In the drawings forming part hereof, 7 designates the accelerator pedal as a unit fulcrumed at its lower portion 8 on a stud 9 mounted in lugs 10 of bracket 11, said bracket 11 being attached to floor board and chassis cross piece 12 adjacent dash cowl 13, the upper end having the usual pivoted thrust rod 14 the connection to the bell-cranks controlling the fuel feed line to the carburator of the vehicle.

The pedal structure 7 comprises a frame 15 carrying lugs 10 and 16 at its lower end into which the pivotal pin 17 or stud 9 is mounted, said pin 17 being mounted in stud supporting lug 18 the latter being attached to the chassis structure or as the case may be to the floor board structure 12 of the vehicle, said frame 15 having a center panel section 19 extending upwardly in frame 15 to a point approximating three-quarters of the length of said pedal frame and is pivoted at that point on cross-stud 19 in bracket 20 on said center panel and bracket 21 affixed to said pedal frame 15 said frame portion and said center panel 18 being surfaced by a rubber facing 22 of the usual form, said panel 19 having mounted on its lower end one or more bracket plates 23, having slots cut therein and apertured at 24 to form a series of adjustment serrations into which the stud 9 and or 17 engage for the varied adjustment of the positioning of the said panel 19 forwardly, to obtain the proper juxtaposition of the operator's foot particularly at the heel portion of the foot effecting a condition whereby the sole portion of the foot is retained in its normal extended positioning.

As defined hereinabove, said adjusting panel 19 may be pivoted at any point, within pedal frame 15 even at the top of said frame as shown in Figures 2 and 3 of the drawings the object thereof being that by increased leverage said center panel's adjusting positions are substantially increased.

Referring to Figures 5 and 6 of the drawings, the pedal structure is of a modified type with relation to that of the structure shown in other Figures 1, 2 and 3 of said drawings, and consists of a major pedal frame 25 having mounted on its lower portion lugs 26 for the ends of stud-rod 9 is the main pivoted support of said pedal, the center adjusting panel 27 being pivoted or hinged at its top on rod or pin 28 its ends 29 finding bearing in the body of said frame and its central support being lug 30 on the extreme upper end of said swinging adjusting panel 27 of the combination pedal structure, the surface facing of both frame 25 and panel 27 being suitably provided with a non-skid rubber covering 31 of standard utility.

The lower end of panel 27 has mounted thereon studs 31 as a bearing means for pin 32 having affixed thereon adjusting rack 33 having a trip clip 34 extending outwardly as an integral part of said rack 33, said rack having cut therein serrated slots 35 for engagement in its adjustment with stud 9 mounted in the lugs 10 of the bracket 11 of the previously described structure, and said rack 33 is maintained under pressure contact with said stud 9 by means of spring 35 for the purposes of securing the proper juxtapositioning of the adjusted portion of said accelerator pedal 7.

It is obvious that operation of the device as is shown and described herein will effect the results defined for its divers objects and that the structure employed may be varied in many ways without altering or limiting the invention herein.

What is claimed and desired to secure by Letters Patent of the United States is:

1. A device of the character described comprising an accelerator pedal, a movable panel plate mounted on said pedal and pivotally disposed thereon, arranged to be adjusted away from said pedal body at the heel portion thereof, a ratchet bar carried by said panel plate adapted to engage a cross bar on said pedal, a spring carried by said panel plate controlling the adjusted position of said plate with relation to the face of said accelerator pedal body, and a trip clip arranged to release said ratchet bar to return said panel plate on the foot reception surface of said pedal.

2. A device of the character described comprising an accelerator pedal, a movable plate pivotally mounted thereon, a toothed rack-bar mounted on said plate, arranged to engage a cross stud on said pedal, a spring engaging said pivoted plate and said pedal body and a trip clip disposed on said pedal arranged to release said rack-bar and automatically return said plate flat upon the foot surface of said pedal.

3. A device of the character described comprising an accelerator pedal, a movable plate pivotally disposed on said pedal structure, a toothed rack-bar carried by said plate arranged to engage a portion of said pedal body, a spring mounted on said plate arranged to engage said pedal body and maintain the flat closed position of said plate, said plate being adjustable away from the surface of said pedal at the heel portion of said panel, and a trip clip arranged to release said rack-bar from said pedal body to reset the foot reception surface of said pedal body from its series of adjusted positions to the normal position of the foot surface of said pedal.

4. An accelerator pedal of the character described comprising a main foot pedal supporting body portion having its surface apertured to form a foot reception structure, a center panel mounted in the aperture formed by said cut-out portion and hingedly disposed at its upper end in said foot reception structure, and a notched rack mounted on the lower end of said center panel arranged to engage the fulcruming stud on which said pedal is mounted, said rack permitting the adjustment of the heel portion of the foot without altering the positioning of the remaining portion of the foot of an operator.

5. A device of the character described comprising a main supporting pedal frame, a center panel hingedly mounted at its upper end in said frame forming a foot reception structure in said pedal frame, a notched rack mounted on the lower end of said center panel arranged to engage the main fulcruming stud for said pedal through which engagement said center panel provides the means of adjusting the heel portion of the foot only, the main frame of said pedal remaining in its pre-set position to form the initial foot reception surface of an accelerator pedal.

References Cited in the file of this patent

UNITED STATES PATENTS

| | | |
|---|---|---|
| 2,481,167 | Siever | Sept. 6, 1948 |
| 2,521,606 | Rodd | Sept. 5, 1950 |
| 2,568,454 | Laverentis | Sept. 18, 1951 |
| 2,628,507 | Juergens | Feb. 17, 1953 |